G. P. RANDOLPH.
VALVE MECHANISM AND GOVERNOR.
APPLICATION FILED OCT. 19, 1909.
970,851.
Patented Sept. 20, 1910.
2 SHEETS—SHEET 2.
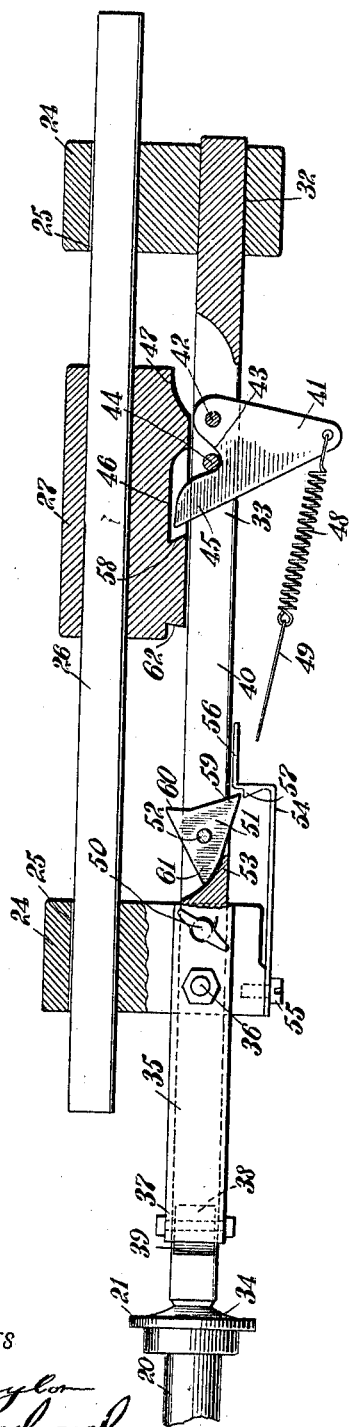
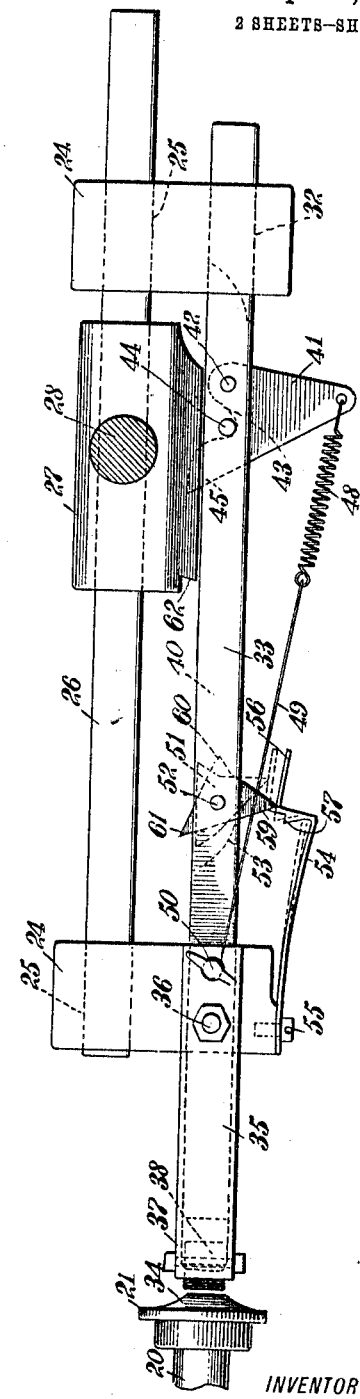
WITNESSES
Geo. W. Naylor
John K. Bradweget
INVENTOR
Guy P. Randolph
BY
Munn & Co.
ATTORNEYS

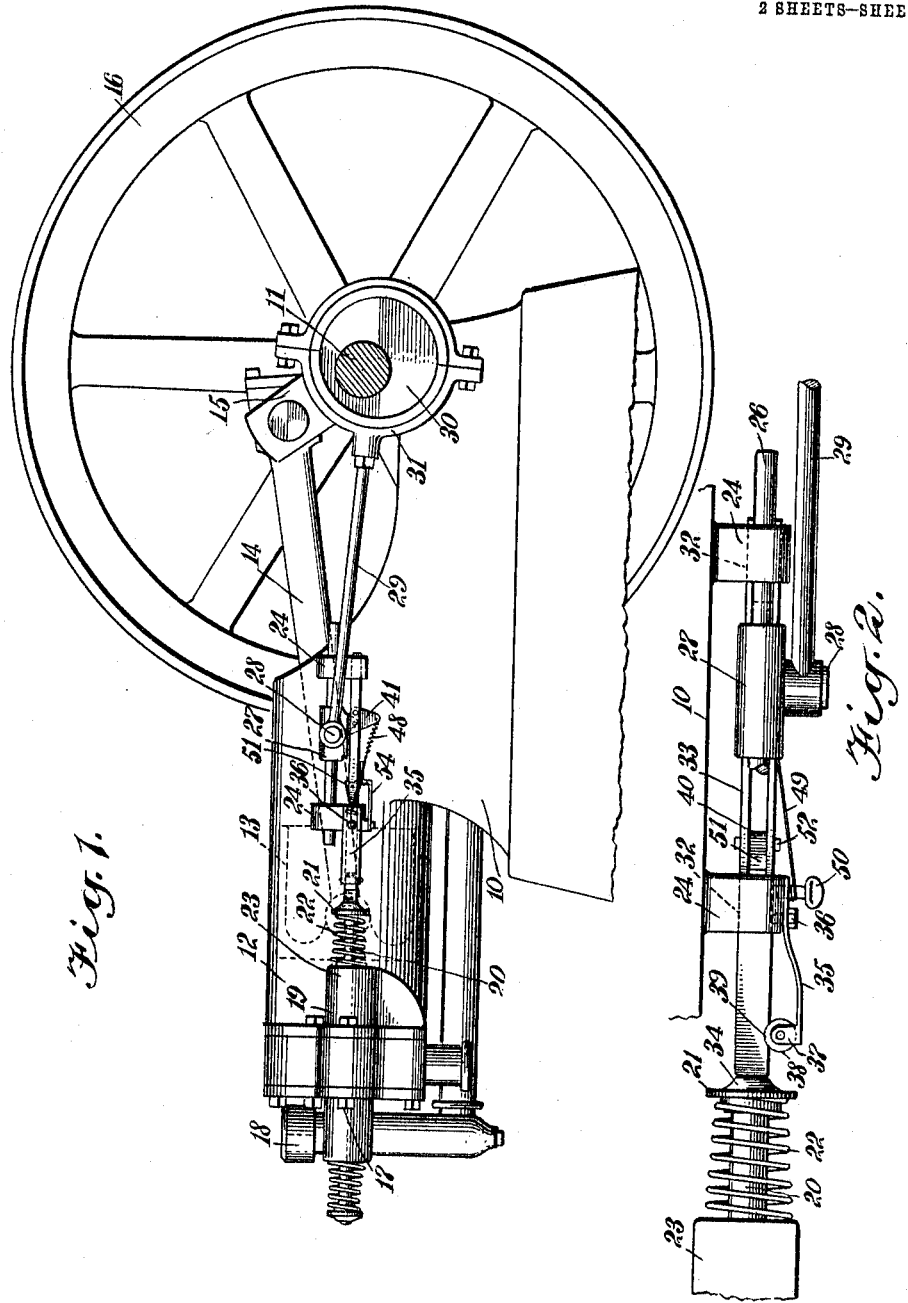

UNITED STATES PATENT OFFICE.

GUY P. RANDOLPH, OF JENNINGS, LOUISIANA.

VALVE MECHANISM AND GOVERNOR.

970,851.  Specification of Letters Patent.  Patented Sept. 20, 1910.

Application filed October 19, 1909. Serial No. 523,390.

*To all whom it may concern:*

Be it known that I, GUY P. RANDOLPH, a citizen of the United States, and a resident of Jennings, in the parish of Calcasieu and State of Louisiana, have invented a new and Improved Valve Mechanism and Governor, of which the following is a full, clear, and exact description.

This invention relates to valve mechanisms and governors for internal combustion engines and the like, and relates more particularly to a device of this class in which the governor, through the valve mechanism, so controls one of the valves of the engine that the latter can receive an explosive charge at any induction stroke after the exhaust or scavenging stroke.

The object of the invention is to provide a simple, strong and efficient valve mechanism and governor for use in combination with internal combustion engines and like motors, which consists of few parts, by means of which the operation of the motor can be so governed that after a predetermined speed has been exceeded the motor ceases to develop power, and which permits the motor to receive a charge or "pick up" at any induction or inlet stroke after the last exhaust stroke, and by means of which the exhaust valve control of four-cycle engines is materially simplified.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an engine having an embodiment of my invention applied thereto; Fig. 2 is a plan view of the device, showing parts broken away; Fig. 3 is an enlarged, longitudinal section having parts broken away; and Fig. 4 is a side elevation showing a part in section and having different positions of certain of the parts indicated in dotted outline.

Before proceeding to a more detailed explanation of my invention, it should be clearly understood that the same is particularly useful in connection with four-cycle internal combustion motors, such as gasolene engines or the like, and that it provides mechanism for controlling the exhaust valve of the engine to regulate the operation of the same, the engine being governed by maintaining the exhaust valve open when a predetermined safe, or desired, speed is exceeded, so that no further power is developed until the speed again returns to the normal. With the ordinary four-cycle engine a charge is drawn in at every fourth stroke, the cycle being: induction stroke, compression stroke, power stroke, and exhaust or scavenging stroke. In other words, every other stroke, for example, every fourth, sixth, eighth, etc., stroke in one direction, *i. e.*, forward or backward, is an induction stroke, by the term "induction" being meant the drawing in or receiving of the explosive mixture which constitutes the charge. If, after running for a certain number of strokes, the speed of the engine has increased to such a point that the governor becomes operative to prevent the further drawing in of charges, the engine ceases to produce power until the speed again falls to such a point that the governor becomes inoperative. The ordinary four-cycle engine cannot, however, pick up, *i. e.*, again receive a charge, until the cycle is completed and the regular induction stroke returns. If the engine receives a charge at every second, fourth, sixth, etc., forward stroke it cannot pick up at an odd forward stroke, and an appreciable period is thereby lost during which the speed of the engine falls still further and more than is necessary. My invention provides means for permitting the engine to pick up at any stroke in a predetermined direction, and, for instance, at the odd forward stroke, in the case above specified, as will appear more clearly hereinafter.

Referring more particularly to the drawings, I have shown, for example, an internal combustion engine having an engine frame 10 upon which is journaled a main or driving shaft 11, and having rigidly connected therewith the cylinder 12. Within the cylinder is the usual piston 13 having a pivoted connecting rod 14 operatively connected with the shaft 11 by means of a crank 15. The shaft has a fly-wheel 16 of the usual type. The cylinder has an inlet valve 17 of any suitable form, connecting with the carbureter 18. The cylinder also has an exhaust valve 19 having a valve stem 20 provided at the free end with a head 21. A spring 22 is mounted upon the valve stem and engages the head 21 and the valve casing 23, tending normally to seat the valve, that is, to close it.

The engine frame has extensions 24 provided with openings 25 therethrough and constituting guides for a slide rod 26 movably mounted in the openings, and held against rotation by suitable keys or the like. A slide block or member 27 is rigidly carried by the rod 26 and has a trunnion 28 upon which is pivotally mounted an eccentric rod 29. The latter is controlled by an eccentric disk 30 rigid with the shaft 11 and encompassed by an eccentric strap 31 connected in the usual manner with the eccentric rod 29, so that the shaft 11 serves to reciprocate the slide rod and block. The guides 24 have further openings 32 in which is slidably mounted a valve-controlling rod or bar 33, preferably of angular cross section, the openings 32 being similarly formed. The rod 32 at one end normally engages the tapered face 34 of the valve stem head 21. A spring arm or keeper 35 is rigidly secured, by means of a bolt 36, or in any other suitable manner, to one of the guides 24 and at the free end has a bifurcated part 37 between the sides of which is rotatably mounted a roller 38. This is normally pressed against the rod 33 by the resiliency of the keeper itself. The rod 33 has near one end a notch or recess 39 adapted to receive the roller 38 so that the rod can be held in fixed position by the roller. The rod 33 has a longitudinal slot or groove 40 in which is pivoted a dog 41 by means of a suitable pin 42. The dog has a reëntrant part or edge recess 43 adapted to receive a transverse pin 44 of the rod 33. The pin 44 constitutes a stop to limit the movement in one direction of the dog. The dog has a nose 45 adapted to engage at the shoulder 58 of the recess 46 of the member 27, so that when the member is moved in one direction it engages the dog, forces the latter against the stop 44, and carries the rod 33 with it. The recess 46 has one end so formed that it slides inoperatively with respect to the dog 41. At the rear end, the member 27 has an inclined cutaway part 47 to permit the member to ride inoperatively over the dog, displacing the latter to allow the nose 45 to enter the recess 46. At the lower end, the dog has secured thereto a spring 48 connected by a line 49 in any suitable manner with an adjusting wing-nut 50 carried by one of the guides 24. The spring tends to hold the dog against the stop 44 and the tension of the spring can be adjusted by means of the wing-nut about which the line 49 is partly wound.

Within the slot 40, and near the end thereof remote from the dog 41 is a second dog 51 substantially triangular in form and movably mounted in position by means of a pivot pin 52. The rod 33 at the end of the slot has a shoulder which constitutes a stop 53 to limit the movement of the dog 51. A spring arm 54 is rigidly mounted by means of a screw 55, or in any other suitable manner, upon the guide 24 adjacent to the valve stem 20, and has the end 56 offset and provided near the offset with a laterally extended shoulder 57, for a purpose to appear more clearly hereinafter.

The eccentric is so constructed that the movement of the slide rod and the member 27 is substantially opposite to the movement of the piston; consequently in the positions of the parts shown in Fig. 3, the piston is nearing the head of the cylinder and the member 27 is moving toward the guide 24 remote from the head of the cylinder. It passes partly over the dog 41, and the preferably undercut shoulder 58 of the recess 46 is about to engage the tongue 45 of the dog. The movement of the member thus causes the rod 33 to move in the same direction as the rod 26 until the roller 38 is forced out of engagement with the recess 39 of the rod 33. The movement of the rod 33 permits the spring 22 to close the exhaust valve held open during the exhaust stroke by the rod 33, the latter in turn being held by the roller 38. Meanwhile the lower point or nose 59 of the dog 51 is brought into engagement with the spring arm 54 at the shoulder 57 and the dog is thereby swung about until the shoulder 53 engages it and forces it to ride on to the offset end 56 of the spring arm as is shown most clearly in Fig. 4. The spring arm pressing radially against the dog with respect to its pivotal point holds it in the position shown in Fig. 4. The piston now moves forward, drawing in a charge, and the member 27 moves in the reverse direction, that is, toward the head of the cylinder, and riding over the dog 41, which is displaced against the tension of the spring 48, until a shoulder 62 at the front of the member 27 engages the nose 61 of the dog 51, swinging the latter into the position indicated in dotted outline in Fig. 4, so that the member 27 can ride over it inoperatively. On the return movement of the member 27, when it has passed beyond the dog 51, the spring arm 54 forces it into a position such that the nose 61 rests upon the shoulder 53, the shoulder 60 being projected upwardly beyond the rod 33 so that it can be operatively engaged by the shoulder 62 of the member 27 to cause the rod 33 to move with the rod 26, to open the exhaust valve. During the above-mentioned return movement the charge is being compressed and is then exploded, the succeeding stroke being the power stroke. During the latter the member 27 moves toward the head of the cylinder and finally opens the exhaust valve for the exhaust stroke as specified above.

When the piston of the engine is drawing in a charge the exhaust valve is of course closed, and it is not opened in the normal operation of the engine, until the rod 33 is forced into engagement therewith by the member 27 which engages the nose 60 of the dog 51. However, if the speed of the engine is such that the member 27 in moving over the dog 41 travels with such rapidity that the spring 48 cannot overcome the inertia of the dog 41 in time to swing it about to let the nose 45 enter the recess 46, the member is inoperative to close the exhaust valve, and slides over the dog 41, without operatively engaging it, so that no power is developed by the engine. This state of affairs obtains until the speed of the engine decreases so much that the slower movement of the member 27 permits the dog 41 to be swung about by the spring 48 in time for the nose 45 to enter the recess 46. It will be understood that the governor can be adjusted by turning the wing-nut 50 to regulate the tension of the spring 48. By tightening the screw the governor is set for a higher speed than when the spring is looser.

Having thus described my invention, I claim as new, and desire to secure by Letters Patent:

1. In combination, with an engine having a valve controlling the operation thereof, two relatively movable members, one of said members controlling said valve, the other of said members being operable by the engine, one of said members having a dog adapted to be engaged by the other of said members, operatively to associate said members, said dog being normally operative, said dog being displaced by said other member, whereby the inertia of said dog prevents the operative engagement of said members when their relative movement exceeds a predetermined speed.

2. The combination, with an engine having a controlling valve, of a member adapted to be reciprocated, and operable by said engine, a second member controlling said valve, and means whereby said first member serves to operate said second member intermittently, said members being arranged side by side.

3. The combination, with an engine having a controlling valve, of a member adapted to be reciprocated, and operable by said engine, a second, valve-controlling member, and means for operatively connecting said members, said means becoming automatically inoperative when a predetermined speed of said first member is exceeded, said members being movable in the directions of their lengths, and being positioned side by side.

4. The combination, with an engine having a controlling valve, of relatively slidable members, one of said members controlling said valve, a dog carried by one of said members and adapted to be engaged by the other of said members operatively to connect said members, resilient means tending to hold said dog operative, said dog being inoperative when the other of said members is moving in one direction, and a spring tending to hold said valve in a predetermined position.

5. The combination, with an engine having a controlling valve, of relatively slidable parallel members arranged out of alinement, one of said members controlling said valve, a dog carried by one of said members and adapted to be engaged by the other of said members operatively to connect said members, and resilient means tending to hold said dog operative, said dog being displaceable by said first member.

6. The combination, with an engine having a controlling valve, of a movable member, means for actuating said member through the operation of said engine, a second movable member controlling said valve, and a device movably associated with one of said members and tending to maintain a normal position such that it can be operatively engaged by the other of said members, said last-mentioned other member when moving in one direction serving to displace said device into an inoperative position, whereby the inertia of said device prevents the operative engagement of said other member therewith, when said member exceeds a predetermined speed of movement.

7. The combination, with an engine having a controlling valve, of a slidable member, means for reciprocating said member through the operation of said engine, a second slidable member controlling said valve, a dog movably mounted upon one of said members, and a spring controlling said dog, whereby said dog tends to maintain a normal, projected position such that it can be operatively engaged by the other of said members, said last-mentioned other member, when moving in one direction, serving to displace said dog into an inoperative position, whereby the inertia of said dog prevents the operative engagement of said other member therewith when said member exceeds a predetermined speed of movement, said member passing inoperatively over said displaced dog before said dog can return to its normal, projected position.

8. The combination, with an engine having a controlling valve, of a slide, a valve controlling member, a movable dog carried thereby and adapted to coöperate with said slide to transmit the movement thereof to said member, means for actuating said slide through the operation of said engine, and a second dog carried by said member and adapted to coöperate with said slide to transmit the movement thereof to said member.

9. The combination, with an engine having a controlling valve, of a slide, a valve-controlling member, a movable dog carried thereby and adapted to coöperate with said slide to transmit the movement thereof to said member, means for reciprocating said slide through the operation of said engine, means for holding said member in position such that said valve is open, a second dog carried by said member and adapted to operate with said slide to transmit the movement thereof to said member, and means controlling said second dog, whereby the same is intermittently operated.

10. The combination, with an engine having a controlling valve, of a slide, a valve-controlling member, means for reciprocating said slide, and a movable device carried by said member and adapted to be engaged by said slide when in a predetermined position, to transmit the movement of said slide to said member, and means controlling said dog, whereby the same is intermittently, operatively positioned for engagement with said slide, said slide serving to displace said device before operative engagement therewith.

11. The combination, with an engine having a controlling valve, of a slide, a valve-controlling member, said valve having means whereby it tends to remain closed, a device tending to hold said member in position such that said valve is open, a dog movably mounted upon said member and tending to maintain a normal, operative position such that it can be operatively engaged by said slide when said slide is moving in one direction, a second dog adapted to be operatively engaged by said slide when said slide is moving in the opposite direction, and means for intermittently, operatively positioning said second dog.

12. The combination, with an engine having a controlling valve, of a slide, a valve-controlling member, means for holding said valve closed, a keeper tending to hold said member in position such that said valve is open, a dog movably mounted upon said member and tending to maintain a normal, operative position such that it can be operatively engaged by said slide when said slide is moving in one direction, a second dog adapted to be operatively engaged by said slide when said slide is moving in the opposite direction, and a spring arm adapted to engage said second dog and serving to hold it in a plurality of positions, whereby said second dog is intermittently, operatively positioned.

13. The combination, with an engine having a controlling valve, of a slide, a valve-controlling member, a spring tending to hold said valve closed, a spring keeper adapted to engage said member to hold the same in position such that said valve is open, a dog movably mounted upon said member, a spring tending to hold said dog in a projected, operative position, whereby it can be engaged by said slide, said slide having a shoulder whereby it can engage said dog operatively when moving in one direction, and having a cutaway part whereby it inoperatively displaces said dog when moving in the same direction, a second dog adapted to be operatively engaged by said slide when said slide is moving in the opposite direction, and a fixed spring arm controlling said second dog, whereby said second dog is intermittently operable with respect to said slide.

14. The combination, with an engine having a controlling valve, of a member adapted to be reciprocated, and operable by said engine, and a second member controlling said valve, said second member having a dog tending to maintain a normal, projected, operative position, said first member having a shoulder adapted to engage said dog when the same is projected, operatively to connect said members when said member is moving in one direction, said first member having a cutaway part, whereby said dog is initially displaced when said first member is moving in the above-mentioned direction.

15. The combination, with an engine having a controlling valve, of a member adapted to be reciprocated, and operable by said engine, a second member controlling said valve, said second member having a dog movably mounted thereon and adapted to project therebeyond, said first member having a shoulder adapted to engage said dog when the same is projected, operatively to connect said members when said member is moving in one direction, said first member having a cutaway part, whereby said dog is initially displaced when said first member is moving in the above-mentioned direction, and an adjustable spring tending to maintain said dog in an operative, projected position.

In testimony whereof I have signed my name to this specification in the presence of two subscribing witnesses.

GUY P. RANDOLPH.

Witnesses:
J. H. HUNEY,
EDITH H. ERVIN.